United States Patent
Kazlauskas

[19]

[11] Patent Number: 6,118,241
[45] Date of Patent: *Sep. 12, 2000

[54] DYNAMIC BRAKING SYSTEM FOR ELECTRIC MOTORS

[75] Inventor: William J. Kazlauskas, Christiansburg, Va.

[73] Assignee: Kollmorgen Corporation, Waltham, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/978,561

[22] Filed: Nov. 25, 1997

[51] Int. Cl.⁷ .................................................. H02P 3/12
[52] U.S. Cl. ...................... 318/375; 318/379; 318/299; 307/254
[58] Field of Search ...................... 318/375, 379, 318/299; 307/254

[56] References Cited

U.S. PATENT DOCUMENTS 4,857,814  8/1989  Duncan ............................... 318/138 X

*Primary Examiner*—Karen Masih
*Attorney, Agent, or Firm*—Morgan & Finnegan, L.L.P.

[57] ABSTRACT

A dynamic braking system for a brushless motor where energization of the motor winding is achieved through a transistor bridge circuit wherein half of the switching transistors are connected to a positive supply and the remaining switching transistors are connected to a negative supply. Back biased diodes are connected across each of the switching transistors. Dynamic braking is achieved by rendering all transistors connected to one of the supply sources conductive at the same time.

10 Claims, 1 Drawing Sheet

DYNAMIC BRAKING SYSTEM FOR ELECTRIC MOTORS

BACKGROUND OF THE INVENTION

Many variable speed motor control systems include dynamic braking capability. In the dynamic braking mode the motor usually operates as a generator and either pumps energy back into the source or dissipates energy into a resistive load. Such dynamic braking can be achieved in both brush-type motors as well as brushless motors (sometimes referred to as AC servo motors). Dynamic braking systems often rely on commutation information to achieve braking control and can add considerable cost to the system and adversely impact reliability. The added components in such systems are costly because of the high current capacity required in the braking system.

SUMMARY OF THE INVENTION

An object of the present invention is to provide dynamic braking which can be added to the motor control system without adding any significant cost.

Another object of the present invention is to provide a dynamic braking system which does not depend upon commutation information in order to operate.

Still another object is to provide dynamic braking which can operate in a failure mode since commutation information is not required.

A further object is to provide a dynamic braking system which can control the degree of dynamic braking by utilizing pre-existing transistors operating in the switching mode.

In a typical brushless DC motor or AC servo motor system, the motor winding is on the stator and is in a three-phase configuration. Energization of the winding is controlled through a six transistor bridge circuit where the transistors are operated in a switching mode according to the rotor position and torque commands. Three of the transistors are connected to the positive supply bus and the remaining three transistors are connected to the negative supply bus. Sinusoidal or trapezoidal excitation of the winding can be achieved by pulse width modulation control of the switching transistors. A back-biased diode is commonly connected across each of the emitter-collector circuits of the switching transistors to bypass transients from the switching control of the inductive motor load.

In accordance with the invention, dynamic braking is achieved by simultaneously rendering conductive the three transistors connected to the positive bus, or the three transistors connected to the negative bus. When three such transistors are simultaneously rendered conductive, current flows to one of the supply busses through one or two of the conductive transistors and returns to the winding through one or more of the back-biased diodes. This arrangement provides dynamic braking regardless of rotor position. The braking operation can be achieved using the three transistors connected to the positive bus or by using the three transistors connected to the negative bus. If sufficient control is provided, the dynamic breaking system can alternate between transistors connected to the positive bus and those connected to the negative bus, thus sharing the load.

When the three transistors connected to a bus are simultaneously rendered conductive, they essentially short circuit the winding and maximum dynamic braking is provided. Pulse width control of the conductive intervals can be used to control the degree of braking and the magnitude of the braking current.

GENERAL DESCRIPTION OF THE DRAWINGS

The foregoing and other objects are achieved as more fully described in the preferred embodiment in the following specification which includes the drawings wherein;

FIG. 1 is a schematic diagram illustrating operation in the dynamic braking mode.

DETAILED DESCRIPTION OF PREFERRED EMBODIMENTS

Figure 1:
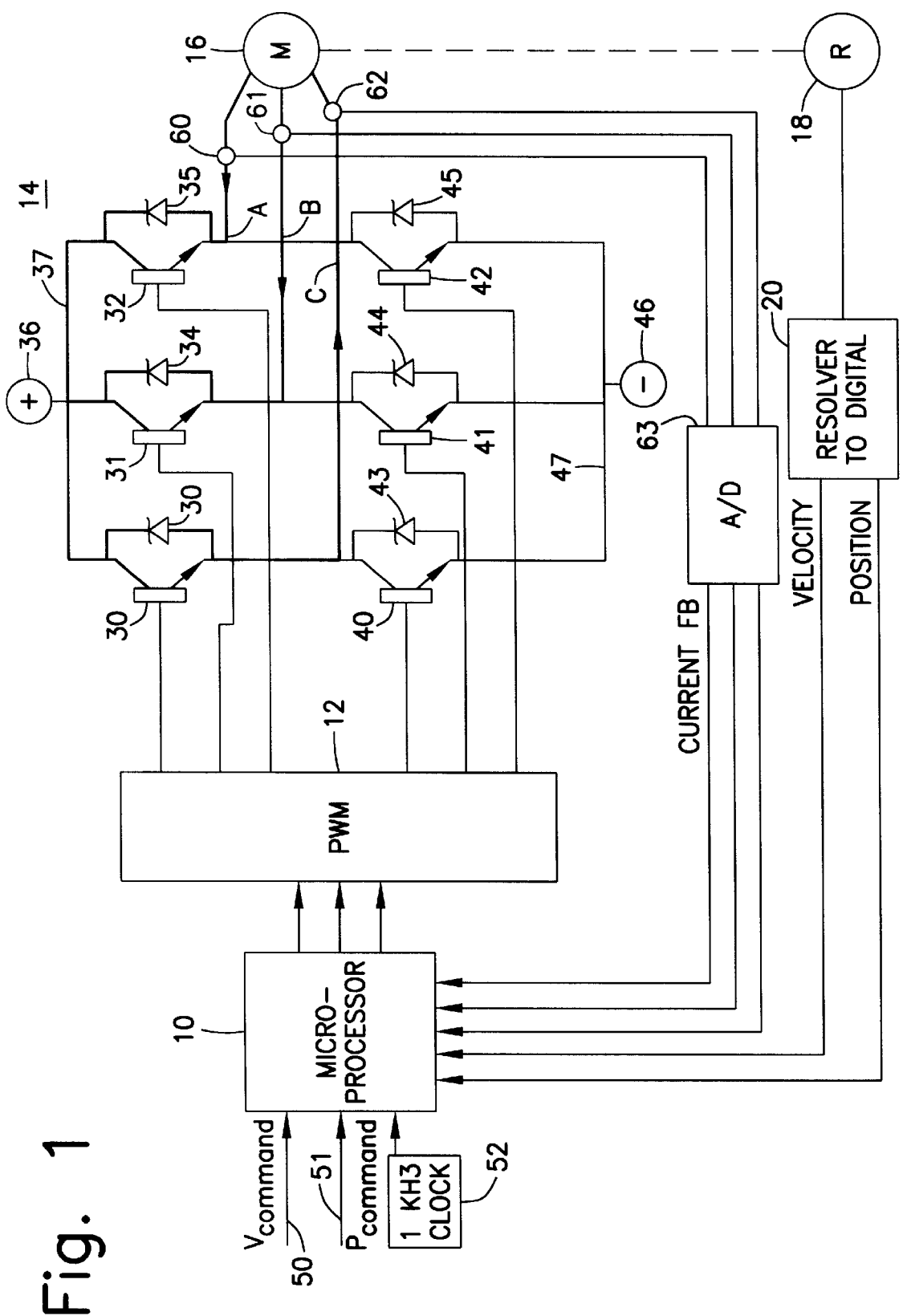

The system according to the invention includes a microprocessor 10 which controls a brushless motor 16 via a PWM (Pulse Width Modulator) 12 and a six transistor bridge circuit 14. A feedback device 18 is connected to the motor shaft and provides information as to the rotor position and rotor velocity which is fed back to the microprocessor. In the normal operation the feedback information is compared with the input commands 50 or 51 to provide servo motor control. If the system is operated as a torque servo, a torque command is compared to the torque of the motor and the motor energization is adjusted accordingly to maintain the desired torque. If the system is operated as a velocity servo, a velocity command 50 is compared to the velocity feedback and the motor energization is adjusted accordingly to maintain the desired speed. If the system is operated as a position servo, the motor energization is adjusted according to distance from the target position by comparing position command 51 to the actual position.

Transistor bridge circuit 14 includes six switching transistors 30–32 and 40–42. The upper set of transistors 30–32 each have their collectors connected to a positive source 36 via a positive bus 37 and their emitters connected to the phase windings of motor 16. A back-biased diode 33 includes a cathode connected to the collector of transistor 30 and an anode connected to the emitter. Back biased diodes 34 and 35 are similarly connected across the collector-emitter circuits of transistors 31 and 32, respectively. The lower set of transistors 40–42 have their emitters connected to a negative source 46 via a negative bus 47 and their collectors connected to the windings of motor 16. Back-biased diodes 43–45 are connected across the collector-emitter circuits of transistors 40–42 with their anodes connected to the emitters and their cathodes connected to the collectors. The outputs of the microprocessor are connected to pulse width modulator 12 which in turn connects to the base elements of three switching transistors to periodically render the transistors conductive.

For dynamic braking either all the upper transistors 30–32 or all the lower transistors 40–42 are simultaneously rendered conductive for current flow from the collector to emitter. If the upper set of transistors is used, and the rotor is in a position such that the motor back emf is positive on phases A and B and is negative on phase C, the braking current flow is as indicated in the heavy lines in the drawing. More specifically, if phases A and B are positive, current flows through diodes 34 and 35 to the bus 37 and then through transistor 30 back to the phase C winding which is negative. The exact current flow path depends on the polarity of the back emf then being generated. If the upper transistors are all rendered conductive, the braking current will flow through one transistor and two diodes or through two transistors and one diode. Similarly, if the lower transistors are rendered conductive in the braking mode, current flows through either one of the transistors 40–42 and two of the diodes 43–45 or through two of the transistors and one of the diodes. Thus, in the braking mode according to the invention the current path is determined by the motor back emf and, therefore, commutation information is not required.

When all the upper transistors 30–32 are conductive, a short circuit path is created through bus 37. Likewise, when all the lower transistors 40–42 are conductive, a short circuit path is created through bus 47. Although in some circumstances such maximum braking may be desired, in most cases control of the interval during which the upper or lower transistors are all conductive is desirable in order to control the degree of braking and the magnitude of the current flow. Current detectors 60–62 sense the current flow in phase windings A, B and C, respectively. The detected current values are supplied to the microprocessor via an analog to digital converter 63. The microprocessor adjusts the width of the intervals during which a set of transistors is conductive to thereby control the degree of braking and the current flow during braking.

While only one preferred embodiment has been shown in detail, it should be obvious that there are numerous variations within the scope of this invention. For example, other switching configurations could be used in combination with motors with a different number of phases. Also digital logic could be used in place of a microprocessor. The scope of the invention is more particularly defined in the appended claims.

What is claimed is:

1. A dynamic braking system for a brushless motor comprising:
   a brushless motor including
      a winding with a plurality of phases, and
      at least one permanent magnet movable relative to said winding;
   an electrical source with a positive bus and a negative bus;
   a pair of transistor switches for each phase of said winding,
      one transistor of each pair for connecting the phase of said winding to said positive bus,
      and the other transistor of each pair for connecting the phase of said winding to said negative bus;
   a back-biased diode connected across the collector-emitter circuit of each of said transistors; and
   a microprocessor for substantially simultaneously rendering conductive all of said transistors connected to one of said buses to provide a braking current path through at least one of said conductive transistors and at least one of said back-biased diodes.

2. A dynamic braking system according to claim 1 wherein said transistors connected to one of said buses are periodically rendered conductive and nonconductive by the microprocessor to control braking current flow.

3. A dynamic braking system according to claim 2 further comprising a current sensor to measure current flow through said winding when operated in said braking mode, and wherein said transistors are rendered conductive and nonconductive according to said current flow.

4. A dynamic braking system according to claim 1 wherein said motor includes a three phase motor winding and wherein said motor braking current flows either
   through one of said conductive transistors and two of said back biased diodes, or
   through two of said conductive transistors and one of said back biased diodes, as controlled by the microprocessor.

5. A motor control system including a dynamic braking system according to claim 1 where in the normal mode of operation said switching transistors are periodically rendered conductive by the microprocessor to provide excitation current pulses to said winding.

6. A dynamic braking system for a brushless motor comprising:
   a brushless motor including
      a winding with a plurality of phases, and
      at least one permanent magnet movable relative to said winding;
   an electrical source with a positive bus and a negative bus;
   a pair of transistor switches for each phase of said winding,
      one transistor of each pair for connecting the phase of said winding to said positive bus,
      and the other transistor of each pair for connecting the phase of said winding to the negative bus;
   a back-biased diode connected across the collector-emitter circuit of each of said transistors;
   a position indicator for indicating the position of said winding relative to said permanent magnet;
   a microprocessor for controlling said motor;
   means for controlling said motor in a motoring mode wherein said winding is energized from said electrical source through said transistor switches rendered conductive in a commutation sequence according to the position indication from said position indicator; and
   means for controlling said motor in a braking mode wherein all of said switching transistors connected to one polarity of said electrical source are simultaneously rendered conductive by the microprocessor so that controlled proportional current flows through at least one of said conductive switching transistors and at least one of said diodes.

7. A dynamic braking system comprising:
   a brushless motor including
      a winding with a plurality of phases, and
      at least one permanent magnet movable relative to said winding;
   an electrical source with a positive bus and a negative bus;
   a pair of transistor switches for each phase of said winding,
      one transistor of each pair for connecting the phase of said winding to said positive bus,
      and the other transistor of each pair for connecting the phase of said winding to said negative bus;
   a back-biased diode connected across the collector-emitter circuit of each of said transistors; and
   a microprocessor for controlling said motor in a braking mode wherein all of said switching transistors connected to one polarity of said electrical source are simultaneously rendered conductive by the microprocessor so that controlled proportional current flows through at least one of said conductive switching transistors and at least one of said diodes.

8. A dynamic braking system for a brushless motor comprising:
   a brushless motor including
      a winding with a plurality of phases, and
      at least one permanent magnet movable relative to said winding;
   an electrical source with a positive bus and a negative bus;
   a pair of transistor switches for each phase of said winding,
      one transistor of each pair for connecting the phase of said winding to said positive bus,
      and the other transistor of each pair for connecting the phase of said winding to the negative bus;
   a back-biased diode connected across the collector-emitter circuit of each of said transistors; and dynamic braking means connected to substantially simultaneously render conductive all of said transistors connected to one of said buses to provide a braking current path through at least one of said conductive transistors and at least one of said back-biased diodes.

9. A dynamic braking system for a brushless motor comprising:

a brushless motor including
  a winding with a plurality of phases, and
  at least one permanent magnet movable relative to said winding;

an electrical source with a positive bus and a negative bus;

a pair of transistor switches for each phase of said winding,
  one transistor of each pair for connecting the phase of said winding to said positive bus, and the other transistor of each pair for connecting the phase of said winding to said negative bus;

a back-biased diode connected across the collector-emitter circuit of each of said transistors; and dynamic braking means connected to substantially simultaneously render conductive all of said transistors connected to one of said buses to provide a braking current path through at least one of said conductive transistors and at least one of said back-biased diodes and to control a magnitude of current flow through said conductive transistors.

10. The dynamic braking system according to claim 9, wherein said dynamic braking means controls the magnitude of current flow by adjusting a width of intervals during which a set of said transistors is conductive.

* * * * *

UNITED STATES PATENT AND TRADEMARK OFFICE
CERTIFICATE OF CORRECTION

PATENT NO. : 6,118,241
DATED : September 12, 2000
INVENTOR(S) : William J. Kazlauskas It is certified that error appears in the above-identified patent and that said Letters Patent is hereby corrected as shown below:

Title page,
In the References Cited item [56] under the subheading U.S. PATENT DOCUMENTS, before "4,857,814  8/1989  Duncan  318/138X" insert -- 4,319,171  3/1982  Motoori  318/379 -- and -- 4,527,103  7/1985  Kade  381/299 --.

Claims,
Claim 7, column 4,
Line 43, prior "negative" change "said" to -- the --.

Claim 8, column 4,
Line 65, prior "negative" change " the" to -- said --.

Signed and Sealed this

Sixteenth Day of October, 2001

Attest:

NICHOLAS P. GODICI
Attesting Officer  Acting Director of the United States Patent and Trademark Office